United States Patent
DeCosta

(10) Patent No.: US 7,554,036 B1
(45) Date of Patent: Jun. 30, 2009

(54) SECTIONAL PLATE FOR WALL PORT INCORPORATING RECESSED SCOOP FOR WIRE MANAGEMENT

(76) Inventor: Thomas J. DeCosta, P.O. Box 70189, North Dartmouth, MA (US) 02747

( * ) Notice: Subject to any disclaimer, the term of this patent is extended or adjusted under 35 U.S.C. 154(b) by 0 days.

(21) Appl. No.: 12/070,082

(22) Filed: Feb. 15, 2008

(51) Int. Cl.
H02G 3/14 (2006.01)
(52) U.S. Cl. .............................. 174/66; 174/67; 174/53; 220/241; 439/76.1
(58) Field of Classification Search ................. 174/66, 174/67, 135, 58, 50, 53, 63, 64; 220/241, 220/242, 3.8, 3.92, 3.94, 4.02; 248/906; 439/535, 76.1
See application file for complete search history.

(56) References Cited

U.S. PATENT DOCUMENTS

| | | | |
|---|---|---|---|
| 3,729,572 A * | 4/1973 | Helin | 174/66 |
| 4,494,815 A | 1/1985 | Brzostek et al. | |
| 4,558,172 A | 12/1985 | Zetena | |
| D286,739 S | 11/1986 | Larsson | |
| 4,688,747 A | 8/1987 | Helmsdorfer et al. | |
| 4,950,840 A | 8/1990 | Zetena | |
| 4,960,317 A | 10/1990 | Briggs et al. | |
| 5,124,506 A | 6/1992 | Briggs et al. | |
| 5,178,350 A * | 1/1993 | Vink et al. | 248/27.1 |
| 5,219,297 A | 6/1993 | Stein et al. | |
| D370,890 S | 6/1996 | Tiberio, Jr. | |
| 5,700,978 A * | 12/1997 | Huff | 174/66 |
| 5,981,875 A * | 11/1999 | Kesler et al. | 174/66 |
| D503,156 S | 3/2005 | Provenzano et al. | |
| 7,271,339 B2 | 9/2007 | Dinh | |
| D553,475 S | 10/2007 | Gorin et al. | |
| 7,390,964 B2 | 6/2008 | Gorin et al. | |
| 2008/0110886 A1 | 5/2008 | Provenzano et al. | |

* cited by examiner

Primary Examiner—Dhiru R Patel

(57) ABSTRACT

A wall plate for electrical wiring, and more specifically, to a flush mounted plate including an inward extended opening for the passage of cables and the like. The plate is capable of being separated, then reconnected and securely interlocked at its mating end to allow for oversized connectors and fittings to be passed therethrough. The wall plate includes a first plate section and a second plate section having cantilever tab-like elements that extend from the ends of each plate section to join the complete plate. Both first and second plate sections further include indentations disposed between the tab-like elements, the indentations coming together to form an access opening when the first and second plates are joined. The first plate section also includes an inward extending cable support passage having an internal sloped wall that projects from the first plate section cutout.

17 Claims, 6 Drawing Sheets

SECTIONAL PLATE FOR WALL PORT INCORPORATING RECESSED SCOOP FOR WIRE MANAGEMENT

BACKGROUND OF THE INVENTION

1. Field of the Invention

The present invention relates to wall plates for electrical wiring, and more specifically, to a flush mounted plate including an inward extended opening for the passage of cables and the like. The plate is capable of being separated, then reconnected and securely interlocked at its mating end to allow for oversized connectors and fittings to be passed therethrough.

2. Description of Related Art

Wall plates to cover electrical devices mounted in gem boxes are well known in the art. Wall box mounted devices such as switches and receptacles are commonly provided with a wall plate serving both as a decorative cover for the device and to prevent access to the areas which contain the electrical wiring. Such wall plates are usually mounted upon the device by one or more screws passing through openings in the plate and received in a threaded aperture in the device. In some installations, two or more devices are mounted in side-by-side relation with a corresponding wall plate for each device.

Other types of wall plates include plates that can be interlocked at their sides to provide for interchangeable wall panel assemblies for each configuration of electrical devices in any number of ganged gem boxes. Each wall plate includes specific openings to accommodate various electrical device apertures.

When communications devices such as stereo systems, televisions, computers, home theaters, etc. are to be placed in a room of a building structure, it is desirable to have the communication cable(s) leading to the equipment pass interiorly through the hollow wall structure to a position adjacent the equipment and then through an opening in the wall board to the equipment. A wall plate having a cable access opening may be mounted in the wall opening for extending the cable into the room and forming a neater look about the wall opening. This also provides a neater look in the room by avoiding the lengths of cable from being exposed in the room.

In the past, wall plates usually were simply flat plastic plates mountable to the wall over the holes in the walls, and the wall plates had access holes passing the cable(s) into the room. This formed a more "finished look" to the cable entry. However, when the hole in the wall plate was not occupied by a cable, or when the cable occupied less than all the space of the access hole, a person could see through the access hole in the wall plate and possibly see into the wall structure.

Later, wall plates were developed that have a cable support extension or "nose shield" that protrudes from the wall plate into the room, with the nose shield having a vertically facing opening that communicates with the horizontally facing access hole in the wall plate. The cable was extended from the access opening and through the nose shield and into the room for connection to the audio/video system, etc. This type of wall plate having a nose-shield has met with popular use since the nose-shield provides a visual barrier through the opening in the wall plate.

More recently, some electrical appliances, particularly flat screen televisions, are mounted directly to the wall, so that the protruding nose of a wall plate interferes with mounting the television in flat abutment with the surface of the wall. The wall plate can be displaced laterally or vertically with respect to the flat screen television with the opening of the nose of the wall plate directed toward the television so as to provide the least exposure of the cable. However, this arrangement does not hide the wall plate or the short run of the cable leading to the television set, and usually is considered visually unappealing.

However, there exists a need for a flush mounted plate including an inward extended opening that allows for the cable access opening to be split then reconnected, to allow for varying size wires and connectors to pass therethrough. Furthermore, there exists a need for the connected plate to withstand the pulling forces of wires and connectors that would otherwise separate the connected plate.

SUMMARY OF THE INVENTION

The foregoing and other problems are overcome, and other advantages are realized, in accordance with the disclosed, alternative embodiments of these teachings.

The present invention relates to wall plates for electrical wiring, and more specifically, to a flush mounted plate including an inward extended opening for the passage of cables and the like. The plate is capable of being separated, then reconnected and securely interlocked at its mating end to allow for oversized connectors and fittings to be passed therethrough.

The invention comprises a first plate section and second plate section that are mateable for easy separation and attachment. Both first and second plate sections include cantilever tab-like elements that extend from the ends of each plate section to join the plates. Both first and second plate sections further include indentations disposed between the tab-like elements, the indentations coming together to form an access opening when the first and second plates are joined.

The first plate section further includes an inward extending cable support passage having an internal sloped wall that projects from the first plate section cutout. The wall is sloped with respect to the first and second plate sections and defines a cable passage oriented at an angle with respect to the connected first and second plate sections that is in registration with the access opening.

The cable support extension extends into the wall structure so that an electrical cable can extend from within the wall structure, along the cable support extension and through the access opening and to the communications device, and the cable support extension forms a sight barrier from outside the wall structure through the access opening.

The first and section plate sections are flat and formed so as to be substantially coextensive with the wall to which it is to be mounted, such that substantially no protrusion extends from the outer surface of the support plate into the room. This enables objects such as a flat screen television to be mounted substantially flush with the vertical wall surface. Furthermore, a separable plate provides an easy means of passing cables with oversized connectors through the passage hole prior to mating the plates together.

Preferably, the cable support passage formed when both first and second plate sections are interlocked extends a distance between 2 and 3½ inches laterally from the interlocked plate, for projecting into the wall structure. Since most wall structures are formed with wall board of less than one inch thickness that are mounted to vertical studs that are 3¾ inches wide, the relatively large cable support extension of the wall plate can be accommodated by the typical wall structure.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

While certain embodiments of the present invention have been illustrated and described herein, the present invention should not be limited to such illustrations and descriptions. It should be apparent to those skilled in the art that changes and modifications may be incorporated and embodied as part of the present invention and are within the scope of the claims.

Figure 1:
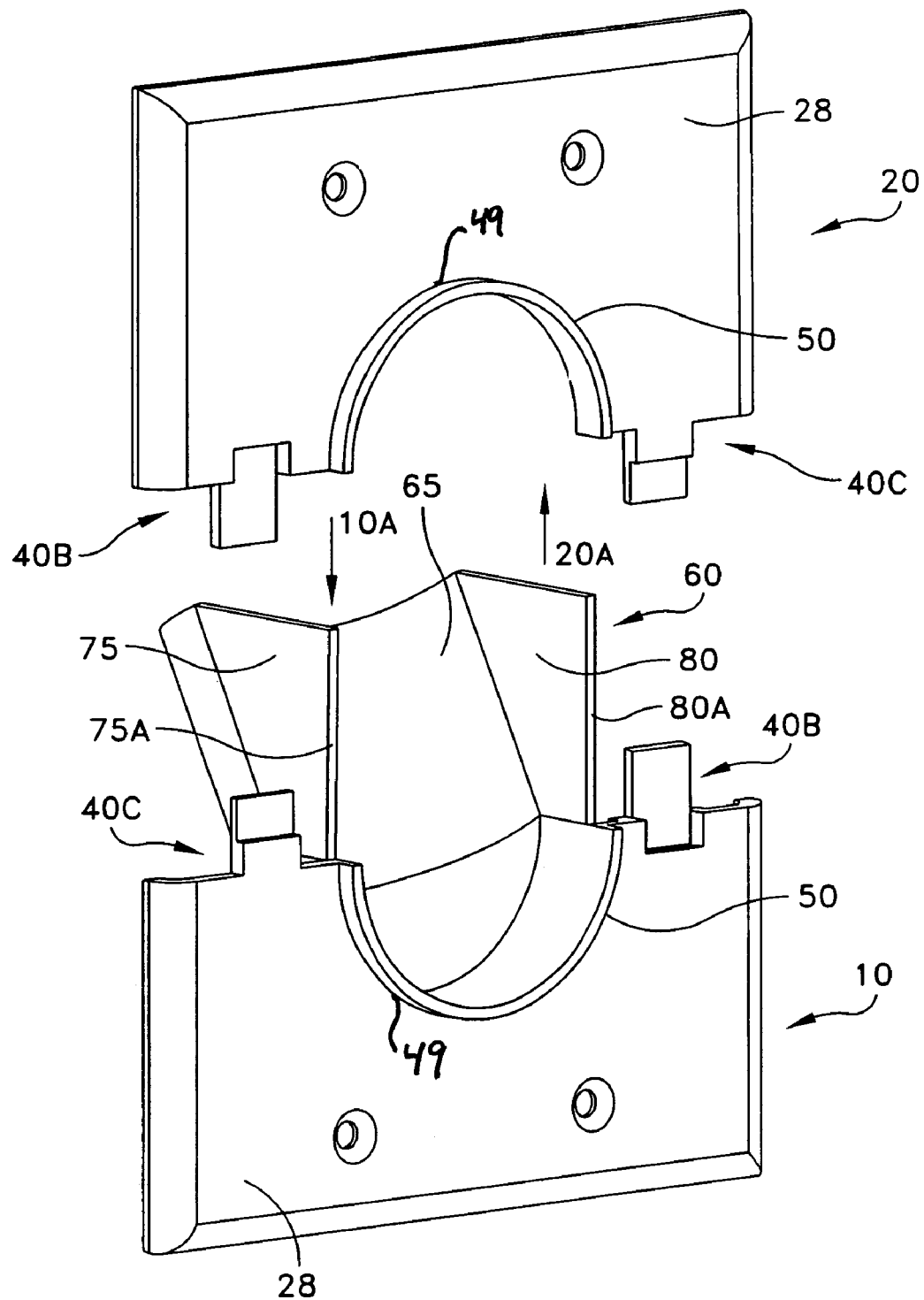
FIG. 1 is a drawing illustrating the principles of subject invention depicting a front perspective view of the separated plate halves.
Figure 2:
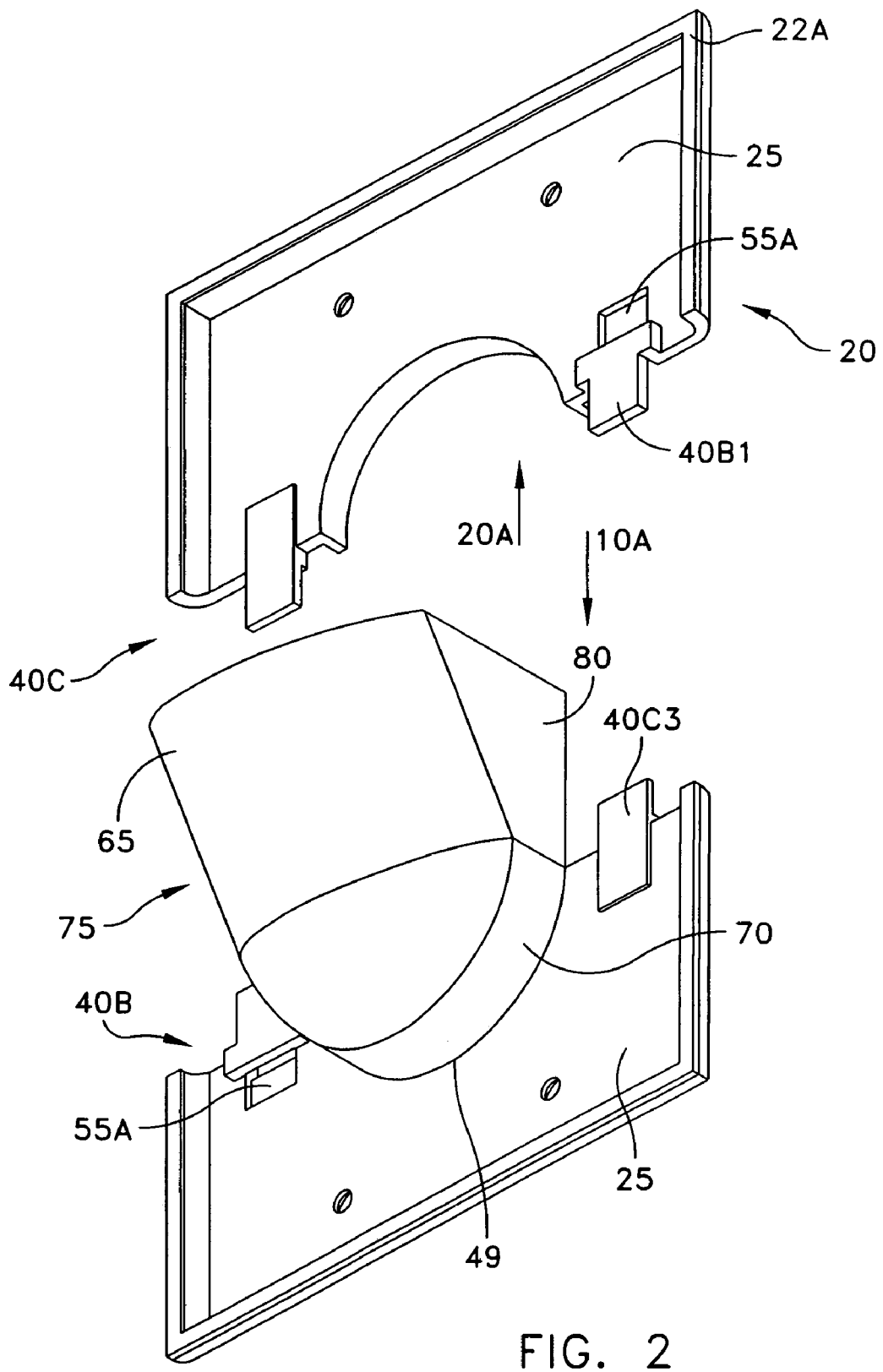
FIG. 2 is a rear perspective view of the drawing of FIG. 1.

Referring to the drawings (FIGS. 1-6) of the invention in detail, FIG. 1 illustrates an embodiment of the present invention comprising a first plate section 10 and second plate section 20 that are mateable for easy separation and attachment. Both first and second plate sections include cantilever tab-like elements 40B and 40C that extend from the ends of each plate section to join the plates. Both first and second plate sections 10 and 20 further include center flange rim 50 disposed between the tab-like elements, the rim 50 extending outward from the top surface 28 of plate sections 10 and 20 along indentation 49.

Flange rims 50 come together to form an access opening when the first and second plate sections 10 and 20 are joined. The rim 50 is a leverage surface to prevent the plate end sections 10A and 20A from collapsing-in during engagement. The rim 50 also serves as a surface area for attaching wire management wrap/cover. The first plate section further includes an inward extending cable support passage 60, extending away from bottom surface 25 and having an internal sloped wall 65. The wall 65 is sloped with respect to the first and second plate sections and defines a cable passage oriented at an angle with respect to the connected first and second plate sections that is in registration with the access opening.

The cable support extension 60 extends into the wall structure so that an electrical cable can extend from within the wall structure, along the cable support extension and through the access opening and to the audio/video equipment, and the cable support extension 65 forms a sight barrier from outside the wall structure through the access opening.

The first and second plate sections 10 and 20 are flat and formed so as to be substantially coextensive with the wall to which they are mounted, such that substantially no protrusion extends from the top surface 28 of the plate sections as illustrated in FIG. 1. This enables objects such as a flat panel LCD or plasma television to be mounted substantially flush with a vertical wall surface.

One possibility is that the cable support passage 60 extends a distance between 2 and 3½ inches laterally from the interlocked plate, for projecting into the wall structure. Since most wall structures are formed with wall board of less than one inch thickness that are mounted to vertical studs that are 3¾ inches wide, the relatively large cable support extension of the wall plate can be accommodated by the typical wall structure.

The cable support passage 60 of the first plate section includes a rear wall 70 (FIG. 2) having at least one side extending outward from the bottom surface 25 of the first plate section along the periphery of the first plate section cutout 49. The rear wall 70 further includes opposed side walls 75 and 80 projecting outward from the first plate section end 10A, the sidewalls 75 and 80 including longitudinally extending, substantially planar support surfaces 75A and 80A (FIG. 1) on which a joined second plate 20 bottom surface 25 will rest.

The cable support passage 60 further includes a sloped bottom wall 65 projecting outward from the first plate section end 10A, in communication with the rear wall 70 and opposed side walls 75 and 80 forming a cable support passage 60. Rear wall 70 allows sloped bottom wall 65 to be displaced rearwardly of first plate section 10 and provides additional space in the cable support passage 60 for cable bundles to be passed therethrough.

Figure 4:
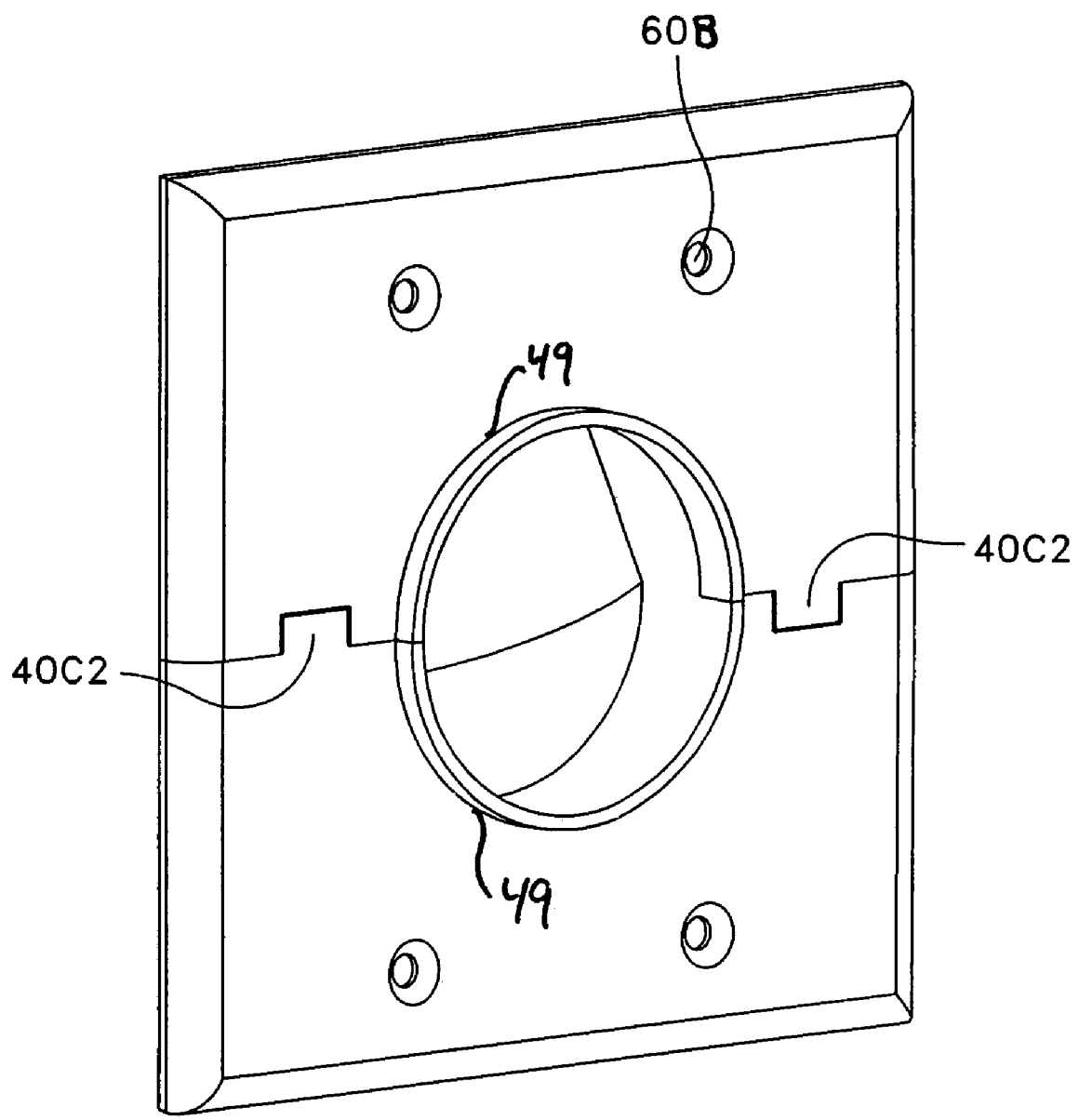
FIG. 4 illustrates the drawing of FIG. 1 with the separated plate halves mated together.
Figure 5:
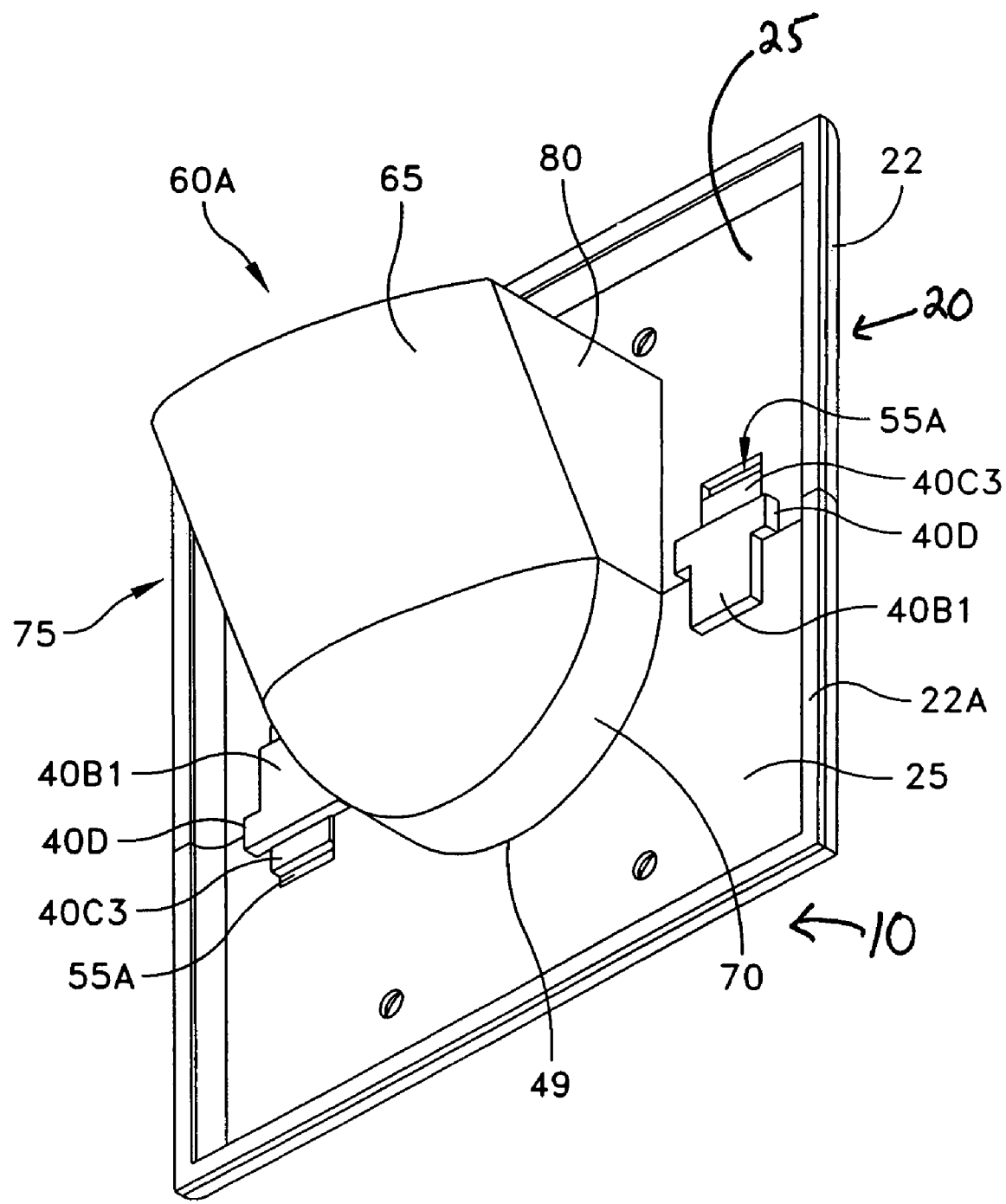
FIG. 5 illustrates the drawing of FIG. 2 with the separated plate halves mated together.

Referring to FIGS. 4 and 5, the cable support passage 60 is open ended having one open end defined by first and second plate section cutouts 49 and an inner open end 60A extending at a right angle with respect to second plate section 20 bottom surface 25. Inner open end 60A extends in a direction laterally from first plate sections 20 bottom surface 25. It is understood that the rear wall 70, side walls 75 and 80, and bottom wall 65 can be molded as a single piece or according to well known practices in the art.

The longitudinally extending, substantially planar support surfaces 75A and 80A in combination with cantilever tab-like elements 40B and 40C interlocking means provides a structurally ridged mated plate having a resistive moment arm to resist outward forces acting to separate the plate sections. The mated plate is therefore capable of withstanding the pulling forces of wires and connectors passing through the access opening.

Figure 3:
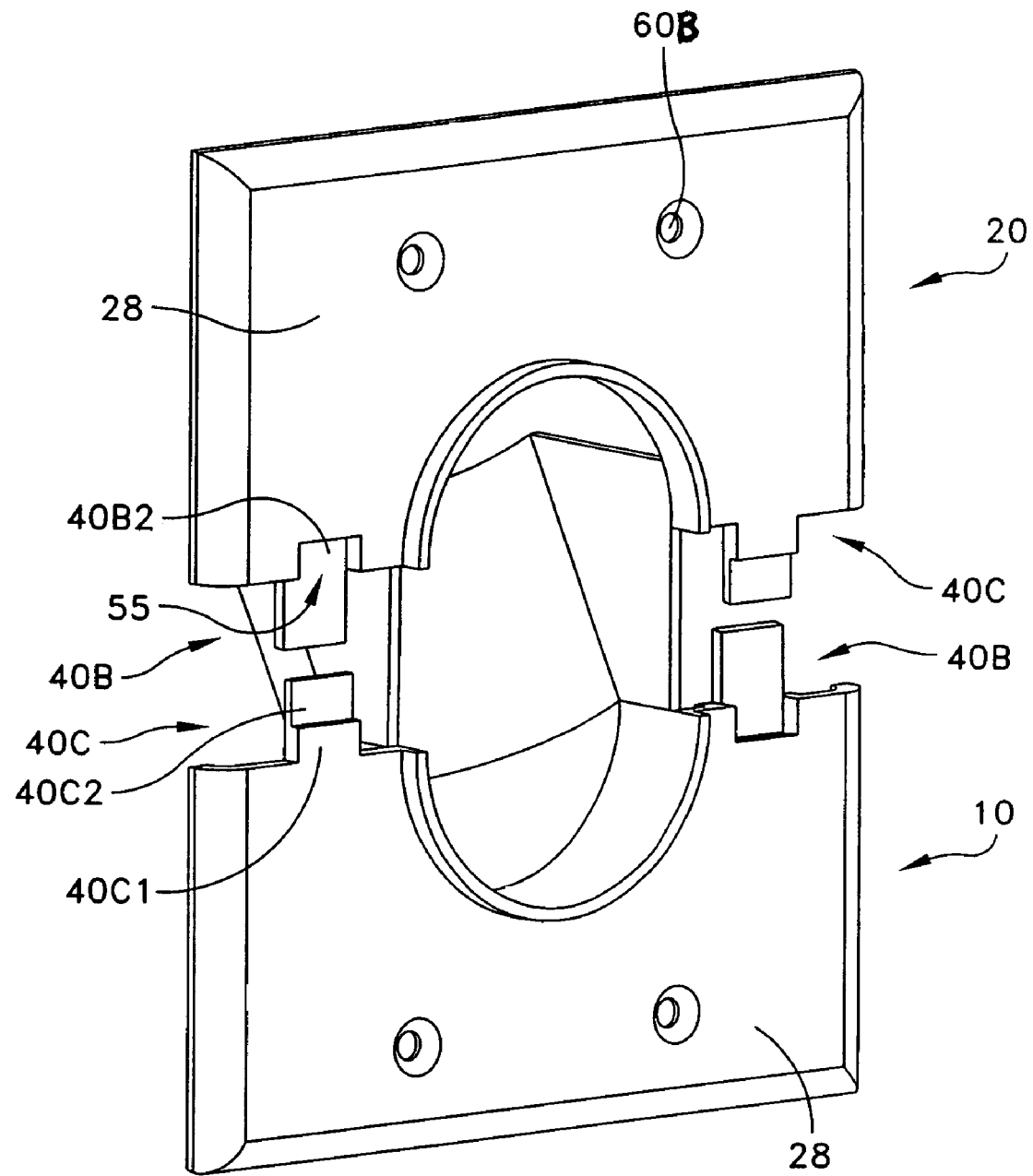
FIG. 3 is a front perspective view of the drawing of FIG. 1 illustrating the plate halves in slideable engagement prior to being mated together.

Referring to FIGS. 3-5, plate sections 10 and 20 include engagement tabs 40B and 40C that are herein described below and incorporated by reference in U.S. Pat. No. 7,112,744, issued Sep. 26, 2006, to applicant.

Plate sections 10 and 20 include a bottom surface 25 that may include a sidewall extension 22. Extension 22 projects outward from bottom surface 25 extending around the periphery of the plate sections 10 and 20 forming a lip therearound. Referring to FIG. 1, first plate section 10 includes an end section 10A that engages end section 20A of second plate section 20. First plate section 10 and second plate section 20 further include cantilever tab-like elements 40B and 40C, the fixed ends of which are integral outward extensions or continuations of end sections 10A and 20A. Tab elements 40B and 40C are rigid and have limited flexibility for movement away from a normal position by application of force. This construction resists plate separation that can occur from cables tugging and pushing against the plate sections when cables are arranged for installation.

Referring to FIGS. 3-6, Tab 40B projects outward from a fixed end 40D that is affixed to and extends between flange rim 50 and sidewall extension 22. An area of fixed end 40D is secured to and rests planar against an area of bottom surface 25. The area of fixed end 40D that is secured to bottom surface 25 is determined according to desired resistance requirements to bending or pulling forces.

Figure 6:
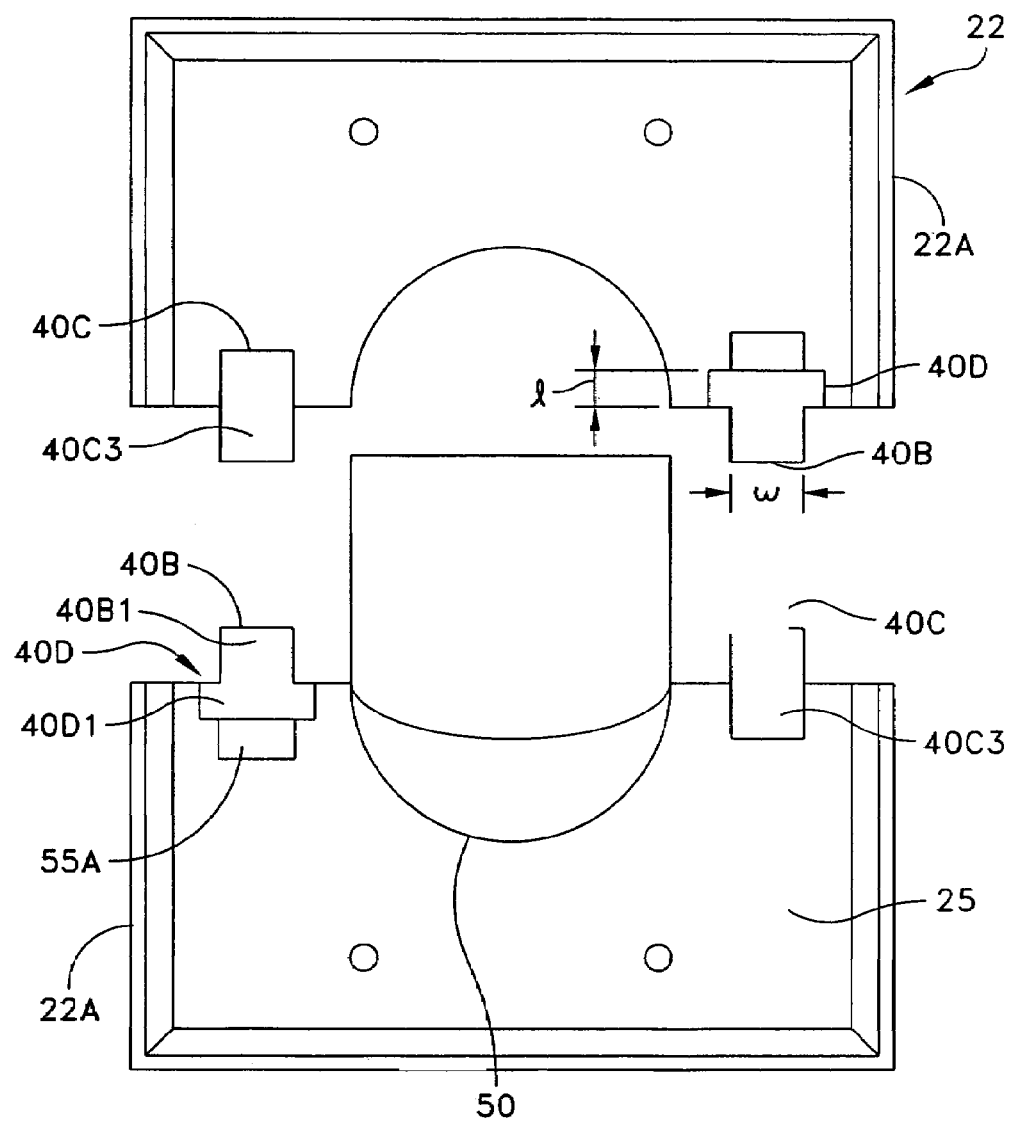
FIG. 6 illustrates a rear top view of FIG. 2.

The thickness of fixed end 40D and tab 40B is determined to allow for structural integrity, but should not extend beyond sidewall extension bottom surface 22A. In the disclosed embodiment, referring to FIG. 6, sidewall extension bottom surface 22A is raised above fixed end bottom surface 40D1 and tab bottom surface 40B1. Referring to FIGS. 3 and 6, top surface 28 of plate sections 10 and 20 includes a cutout 55 extending the length l of fixed end 40D and the width w of tab 40B.

Tab 40C comprises a stepped shaped member with an outwardly extending end portion 40C2 and generally perpendicular base portion 40C1. Tab 40C extends outward from the corners of end sections 10A and 20A, between flange 50 and sidewall extension 22, and is integral to bottom surface 25 such that sidewall extension bottom surface 22A extends beyond tab bottom surface 40C3. Tab bottom surface 40C3 is raised slightly above bottom surface 25, in the disclosed embodiment, and the inventor contemplates up to about 0.011 inches for secure alignment of plate sections 10 and 20, however other dimensions may be utilized depending on plate sizes and tab dimensions for a particular application.

Cutout 55 provides an opening above tab top surface 40B2 for insertion of base portion 40C2. Referring to FIGS. 3-6, a recess 55A extends from the periphery of fixed end 40D into bottom surface 25. The recess 55A is of sufficient dimension to allow for base portion 40C2 to slideably engage recess 55A of bottom surface 25 when plates 10 and, 20 are mated together.

Referring to FIG. 3, 5, and 6 first plate section 10 and second plate section 20 are brought together such that tabs 40B and 40C of each plate section engage the complete plate. End portion 40C2 slideably engages recess 55A of bottom surface 25 up to a point where base portion 40C1 is secured into cutout 55. Tab 40B inserts below tab 40C with tab 40B top surface 40B2 slideably engaging tab 40C bottom surface 40C3.

First plate section 10 substantially planer support surfaces 75A and 80A of opposed sidewalls 75 and 80 slideably engage bottom surface 25 of second plate section 20 up to the point when both first plate section 10 and second plate section 20 are mated together as illustrated in FIGS. 1-5. FIG. 3 illustrates a first plate section 10 as it is brought into slideable engagement with bottom surface 25 of second plate section 20 prior to being fully mated together.

Referring to FIG. 4, a top view of a connected plate illustrates base portions 40C1 secured into cutouts 55. Referring to FIG. 5, a bottom view of a connected plate illustrates tab 40B bottom surfaces 40B1 and fixed end 40D placement along bottom surface 25. FIG. 4 further illustrates bottom surface 40C3 of end portion 40C2, which is secured within recess 55A. Tabs 40B, 40C, and substantially planer support surfaces 75A and 80A of opposed sidewalls 75 and 80 provide resistance to outward forces from cables bending or pulling against flange rim 50. Pass through apertures 60B allow screws to secure the sectional plate to an electrical box.

Although the description above contains many specificities, these should not be construed as limiting the scope of the embodiment but as merely providing illustrations of some of the presently preferred embodiments. For example, the size of the plate sections, openings, and cable support passages therein may be configured for a single or multiple gang backless box or wall cutout opening, according to a particular application. It is understood that these variations are within the scope of the present invention.

I claim:

1. A wall plate assembly having first and second mateable sections, for mounting about a wall opening of a wall in a hollow wall structure for passing of communications cable from inside the hollow wall structure through the wall opening to outside the hollow wall structure, comprising:

a first mateable section having an bottom surface for mounting against the wall and about the wall opening, and an opposed outer surface, said first section having an end section, said end section having first and second engagement tabs extending outward therefrom, said end section having an indentation for alignment with the wall opening, said indentation formed between said first and second engagement tabs, said first section end section further including a cable support passage extending outward from said first section bottom surface, said cable support passage extending through the wall opening and into the wall structure, said cable support passage sloped with respect to said first section, a second mateable section having an bottom surface for mounting against the wall and about the wall opening, and an opposed outer surface, said second section having an end section, said end section having first and second engagement tabs extending outward therefrom, said first and second engagement tabs of said first sections being relatively configured and arranged such that, upon relative linear movement of said first section end section with said end section of said second section, into engagement with one another, said first engagement tab of said first section, engages said second engagement tab of said second section, and said second engagement tab of said first section engages said first engagement tab of said second section, said engaged first and second sections defining an opening, said opening in communication with said cable support passage.

2. The wall plate assembly of claim 1, wherein said first and second sections have an outer surface that is flat and formed to be substantially co-extensive with the wall to which it is to be mounted such that no protrusion extends from the outer surface of said first and said second mateable sections that would obstruct the mounting of a communications device in abutment with the wall plate.

3. The wall plate of claim 1, wherein said end section of said second mateable section further comprises an indentation for alignment with the wall opening, said indentation formed between said first and second engagement tabs of said second section, said second section indentation expanding said opening of said engaged first and second sections.

4. A wall plate assembly according to claim 3, wherein said first and second interchangeable sections include an outwardly extending flange rim, said flange rim extending outward from the periphery of said first and second section indentations, said flange rim acting as a bend radius.

5. A wall plate assembly according to claim 4, wherein said first and second engagement tabs are located between said flange rim and said sidewall extension.

6. The wall plate of claim 1, wherein said cable support passage further includes a sloped bottom wall projecting outward from said first mateable section bottom surface, a rear wall, and opposed side walls, said sloped bottom wall in communication with said rear wall and opposed side walls forming a U-Shaped passage.

7. The wall plate of claim 4 wherein said rear wall is displaced rearwardly of said first mateable section bottom surface.

8. The wall plate of claim 1, wherein said cable support passage further comprises a support surface, said bottom surface of said second mateable section slideable engaging and resting upon said support surface of said outwardly extending cable support passage.

9. The wall plate of claim 4, wherein said opposed side walls further comprise a support surface, said bottom surface of said second mateable section slideably engaging and resting upon said support surface of said opposed side walls.

10. A wall plate assembly according to claim 1, wherein said outwardly extending second engagement tab of said first and second mateable sections is a stepped shaped member.

11. A wall plate assembly according to claim 10, wherein said stepped shaped member includes a base portion and an end portion, said base portion including a top surface, said base portion top surface substantially planar to said panel top surface, said end portion stepped down from said base portion top surface and extending outward therefrom, said end portion further including a top surface and a bottom surface, said end portion bottom surface substantially planar to said panel bottom surface.

12. A wall plate assembly according to claim 11, wherein said stepped shaped member end portion bottom surface is raised above said panel bottom surface.

13. A wall plate assembly according to claim 12, wherein said end portion bottom surface is raised up to 0.011 inches.

14. A wall plate assembly according to claim 1, wherein said first engagement tab of said first and second mateable sections includes a first tab base and a first tab end, said first tab base and said first tab end including a top surface and a bottom surface, a first portion of said first tab base top surface affixed to said bottom surface of said first and second mateable sections, said first tab end projecting outward from said first tab base.

15. A wall plate assembly according to claim 14, wherein said first engagement tab of said first and second mateable sections further includes an opening for receipt of said second engagement tab therein, said opening including a cutout in said panel end section, said cutout exposing a second portion of said first tab base top surface, said opening further including a recess in said panel bottom surface, said recess extending from the periphery of said cutout, said recess dimensioned to accept said stepped down end portion.

16. A wall plate assembly according to claim 15, wherein said cutout is dimensioned to accept said base portion of said stepped shaped member securely therein, wherein said recess is dimensioned to accept said stepped down end portion of said stepped shaped member securely therein, said first engagement tab end top surface of said first and second mateable sections slideably engages said stepped shaped member end portion bottom surface of said first and second mateable sections, said first and second engagement tabs being interconnected.

17. A wall plate assembly according to claim 1, wherein said cable support passage forms a U-shape that extends along and partially surrounds said end section indentation and defines a cable passage with respect to said first section.

* * * * *

UNITED STATES PATENT AND TRADEMARK OFFICE
CERTIFICATE OF CORRECTION

| | | |
|---|---|---|
| PATENT NO. | : 7,554,036 B1 | Page 1 of 1 |
| APPLICATION NO. | : 12/070082 | |
| DATED | : June 30, 2009 | |
| INVENTOR(S) | : Thomas J. DeCosta | |

It is certified that error appears in the above-identified patent and that said Letters Patent is hereby corrected as shown below:

In the claims,
 Claim 7, Col. 6, Line 56, change "4" to --6--

Claim 9, Col. 6, Line 64, change "4" to --6--

Signed and Sealed this

Sixteenth Day of November, 2010

David J. Kappos
*Director of the United States Patent and Trademark Office*